Aug. 19, 1930. A. KÉGRESSE 1,773,534
FLEXIBLE TRACK BELT
Filed Dec. 30, 1926   3 Sheets-Sheet 1
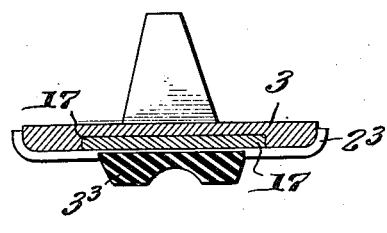
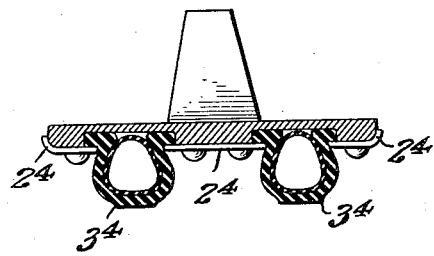
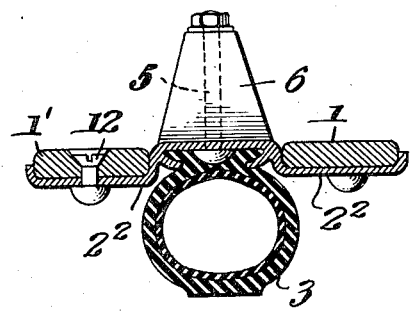
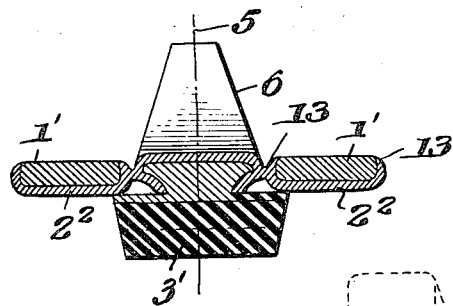
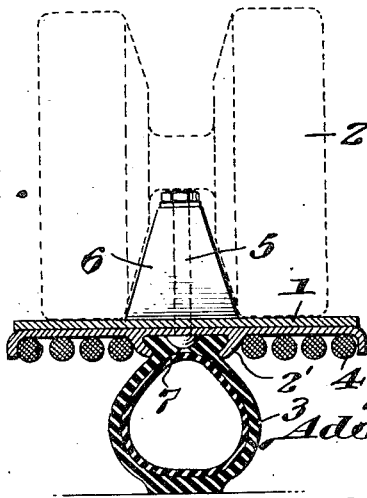

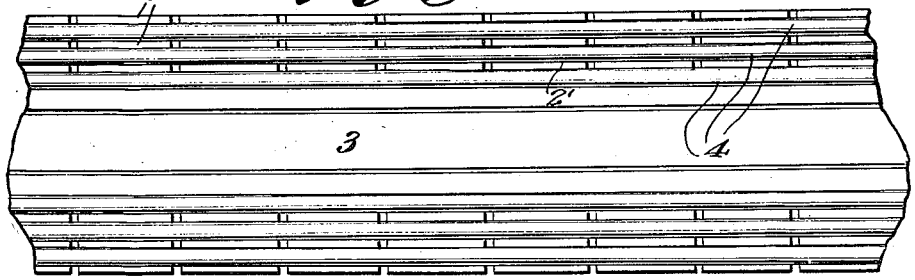
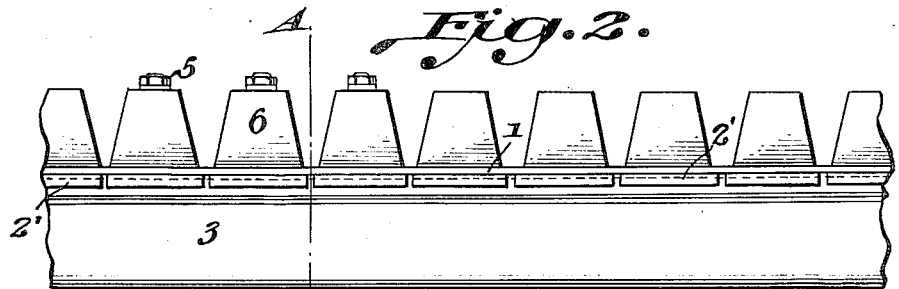
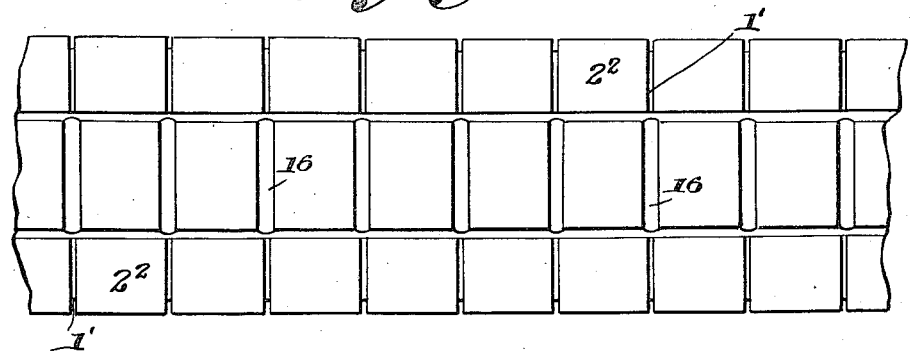
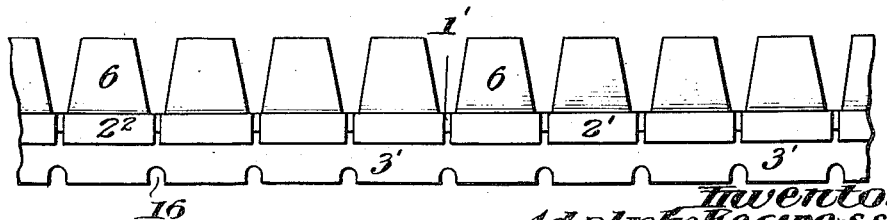

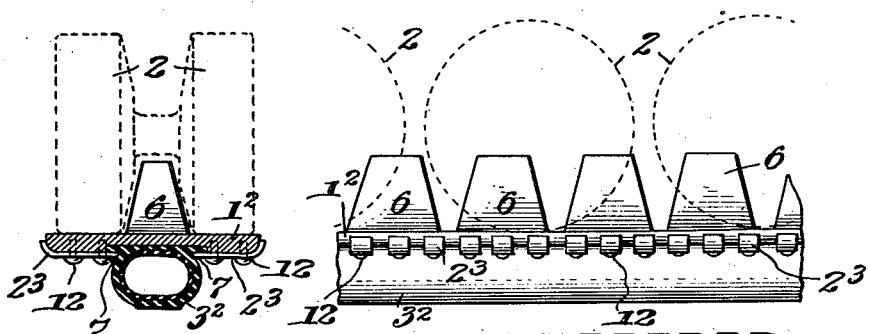
Fig. 9.
Fig. 8.
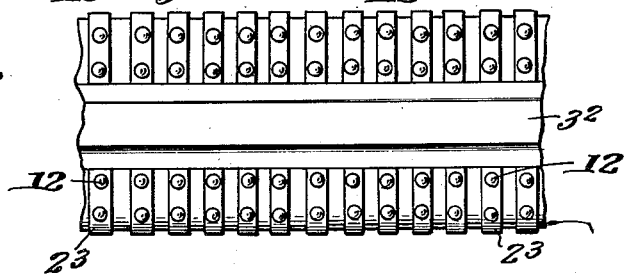
Fig. 10.
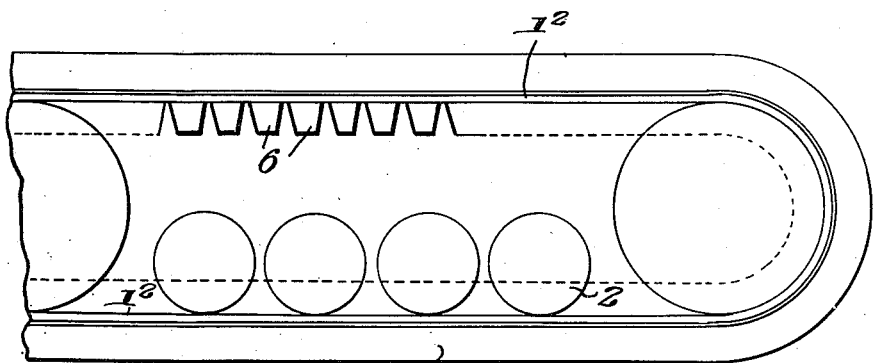
Fig. 11.
Inventor,
Adolphe Kégresse,
By Emil Bönnelyche
Atty.

Patented Aug. 19, 1930

1,773,534

UNITED STATES PATENT OFFICE

ADOLPHE KÉGRESSE, OF LEVALLOIS-PERRET, FRANCE

FLEXIBLE TRACK BELT

Application filed December 30, 1926, Serial No. 157,990, and in France December 31, 1925.

The object of my invention is to provide a flexible endless track belt for motor vehicles having on its inner face a guiding and driving device of known type on each side of which run the vehicle supporting or bearing rollers, while the outer face of said belt is so designed as to receive one or more removable tires, either pneumatic or made of some resilient material, forming a continuous ground tread. Rigid cross strips or plates are interposed between the continuous roller tread and the continuous ground tread; said plates being arranged very close to one another so as to insure an even tread for the rollers at a certain height above a hard road surface and to limit the sinking into soft ground. The plates are so shaped as to permit the rollers to bear against one face thereof, while the ground tread bears against the other face.

In order to make my invention more clearly understood, I have illustrated as examples various embodiments thereof in the accompanying drawings, wherein:

Figure 1 is a cross-section on line A—B of Fig. 2, the latter showing a portion of a track belt the ground tread of which is constituted by a pneumatic tire;

Fig. 3 is a bottom plan view of Fig. 2;

Fig. 4 is a cross-section of a modification;

Fig. 5 shows, also in section, the mounting of a ground tread constituted by a solid tire;

Fig. 6 is a side elevation of Fig. 5, and Fig. 7 is a bottom plan view of Fig. 6;

Fig. 8 is a cross-section of another modification;

Fig. 9 is a fragmental side elevation of the belt shown in Fig. 8;

Fig. 10 is a bottom plan view of Fig. 9;

Fig. 11 is a fragmental, diagrammatic side elevation of the belt system;

Fig. 12 shows in section a modification comprising a solid tire;

Fig. 13 shows in section another modification with twin pneumatic tires.

I will first describe the device illustrated by Figs. 1, 2 and 3.

On the flexible endless belt 1 (Figs. 1 and 2), which serves as a tread for the rollers 2, are secured at regular intervals and almost in contact with one another metal plates 2' that extend across the whole width of the belt and are so disposed as to engage at their outer faces a removable tire 3 forming a ground tread and shown as a pneumatic tire in Fig. 1.

On each side of the tire 3 cables 4 are mounted, which are stretched and hooked over plates 2', so as to prevent their being displaced laterally with respect to each other and to said tire during travel. The inner faces of the plates 2' are caused to bear on the endless belt 1 by means of bolts 5 which at the same time fasten on the belt the guiding and driving blocks 6 of known type. These cables, which are more rigid than the belt 1, will determine the developed length of the set; and the beads 7 that secure tire 3 are arranged in the same plane as the cables, so that they will have the same developed length as the latter and, consequently, will travel at the same speed. There will, therefore, be no tendency toward relative motion between the ground tread tire and the rest of the set.

On the other hand, it will be apparent that, owing to the rigid cross plates 2' being secured very close to one another on the belt 1 on the face opposite the tread or tire 3, the rollers will, on hard ground, travel at a certain height above the ground corresponding to the height of the tire. On soft ground, the tire sinks and the whole width of the belt then comes into action, whereupon plates 2' serve to protect the roller tread belt.

The above combination renders it possible to provide extremely broad flexible belts for travel over soft ground, such belts having for travel over hard ground, such as roadways, for instance, a narrow and continuous resilient tread. It will be apparent, moreover, that the rollers 2 need not be of the same width as the belt but may be narrower, the rigid cross plates 2' being obviously capable of possessing a marked overhang. Furthermore, it will be realized that the metal plates, being secured closely adjacent to one another, insure perfect continuousness of the roller tread, and that were not this condition fulfilled no useful speed could be obtained. As a matter of fact, it is obvious that if the plates were somewhat spaced, the carrier rollers, influenced by their load, would depress the flexible belt 1 on which they run into the spaces, with the result of causing jolting and jarring of the rollers during their travel, which would check the speed and endanger the life of the set.

Fig. 4 represents, in section, a belt in which the roller tread is composed of two independent endless belts 1′ which are connected together by plates 2², of suitable shape and very closely adjacent, like the plates 2′ of Figs. 1, 2 and 3. These plates 2² are designed to engage on one face, in their middle, the ground tread tire which is formed by the pneumatic tire 3 in Fig. 4 and by a solid tire 3′ in Figs. 5, 6 and 7, and, on the other hand, on their opposite face and on each side of the ground tread, the said two belts 1′ which serve as a continuous tread for the rollers (not shown).

The tread belts 1′ may be secured to the plates 2² either by means of screws and nuts or of rivets 12 (Fig. 4) the heads of which are sunk in the belts, or they may be hooked on or clamped in any suitable manner as, for instance, in the manner represented in Fig. 5 where the edges 13 of the plates are bent around the edges of the belts. The guiding and driving blocks 6 are secured, as before, by means of bolts 5 directly to plates 2². Here, the mean developed length is determined by the two roller tread belts and the tire-securing beads which are on the same level; and it should be noted that the aforesaid beads are made less flexible than the rest of the tire so that the developed length of the bead controls, as it were, the actual developed length of the rest of the tire.

The part of the tire contacting with the ground is formed with transverse notches 16 (Figs. 6 and 7) which serve to improve both the adhesion of the tire and its flexibility; such tire, therefore, lending itself without difficulty to any deformations which it is expected to undergo. Similarly, in the type shown in Fig. 4, it is well known that the beads of tires are almost inextensible, while the cover itself, together with its inner tube, lends itself to all sorts of deformation.

In Figs. 4, 5, 6 and 7, as in the case of Fig. 1, the rigid cross plates permit the rollers to be suspended above the ground, during travel over hard ground, and limit the sinking into soft ground. Also, and as before, the plates 2² are arranged very close together so as almost to contact, in order to prevent the belts 1′ from being pressed downward between the edges of the plates which, as has already been explained, would preclude rapid travel and would soon spoil the belts 1′ themselves and injure the mechanism.

In the constructions represented in Figs. 8, 9 and 10 nearly the same general characteristics are found as in the preceding figures. The endless belt 1² carries on its inner face, as before, a guiding and driving device constituted by blocks 6, on each side of which are the continuous treads for the rollers 2, such treads being formed by the inner face itself of the belt. The outer face of the belt is designed to receive a pneumatic tire 3² which is kept in place on the belt by means of narrow and rigid cross pieces 2³ secured at approximately equal intervals by rivets 12 or by bolts. As will be readily understood, flexibility of the belt is insured owing, on the one hand, to the narrowness of pieces 2³ and, on the other hand, to the intervals provided between them.

Fig. 12 shows the mounting of a tire 3³ (solid, in this instance) grafted on a dummy belt 17 that serves as a backing for it and the sides of which protrude beyond the tire and serve as a securing means for the main belt 1³ by means of pieces 2³ like those provided in Fig. 8 for securing the pneumatic tire 3². As in the preceding cases, the form of the flat part protruding on either side beyond the tire may vary indefinitely.

Fig. 13 shows a plurality of counterpart tires 3⁴ secured by means of cross-pieces 2⁴. While in the foregoing embodiment two cross-pieces were sufficient to hold the tire, at least three are required here, one on each side and one in the middle serving to hold the inner beads of both tires in case two tires are used.

To remove the ground tread, when said tread is constituted by a pneumatic tire, it merely has to be deflated and to be withdrawn laterally, which is possible owing to the flexibility of the belt.

It will be noted that the metal cross-pieces, like the plates of Figs. 1 to 7, serve not only to keep the removable tread in place but also as a shield or armour for protecting the belt itself, for instance on very stony ground where pebbles or flints are encountered the size of which exceeds the height of the tread belt.

I claim as my invention:

1. A track belt for motor vehicles embodying a set of bearing and supporting rollers, comprising endless, flexible belt means, the inner face of which provides a continuous trackway for the rollers; a multiplicity of metal members secured transversely to the outer face of the belt means with their adjacent edges in parallel relation; and an endless resilient tire having a width which is less than the length of the metal members extending around the said outer face of the belt means and attached to the said members.

2. A track belt for motor vehicles embodying a set of bearing and supporting rollers, comprising endless, flexible belt means, the inner face of which provides a continuous trackway for the rollers; a multiplicity of metal members secured transversely to the outer face of the belt means with their adjacent edges in parallel relation; and an endless pneumatic tire extending around the said outer face of the belt means and fixed between the ends of the metal members.

3. A track belt for motor vehicles embodying a set of bearing and supporting rollers, comprising endless, flexible belt means, the inner face of which provides a continuous trackway for the rollers; a multiplicity of metal members secured transversely to the outer face of the belt means with their adjacent edges in parallel relation; and an endless pneumatic tire extending around said metal members, said tire having attaching beads which are fastened to the belt means by said metal members.

4. A track belt for motor vehicles embodying a set of bearing and supporting rollers, comprising endless, flexible belt means, the inner face of which provides a continuous trackway for the rollers; a multiplicity of metal members secured transversely to the outer face of the belt means with their adjacent edges in parallel relation and close together; and an endless resilient tire connected to the belt means and extending around its said outer face along a line substantially medial of said belt means.

In testimony whereof I affix my signature.

ADOLPHE KÉGRESSE.